Jan. 9, 1968          D. E. BAWDEN          3,363,162
METHODS AND APPARATUS FOR CHARGING BATTERY
Filed March 1, 1965
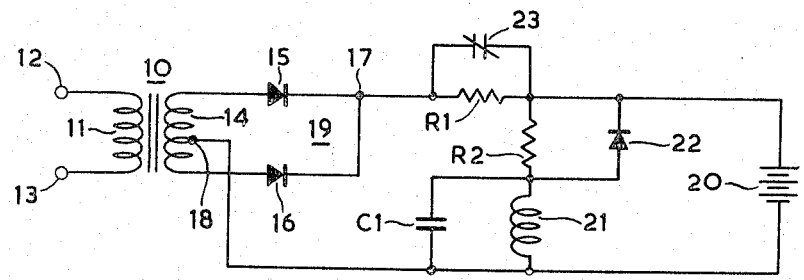
FIG. 1
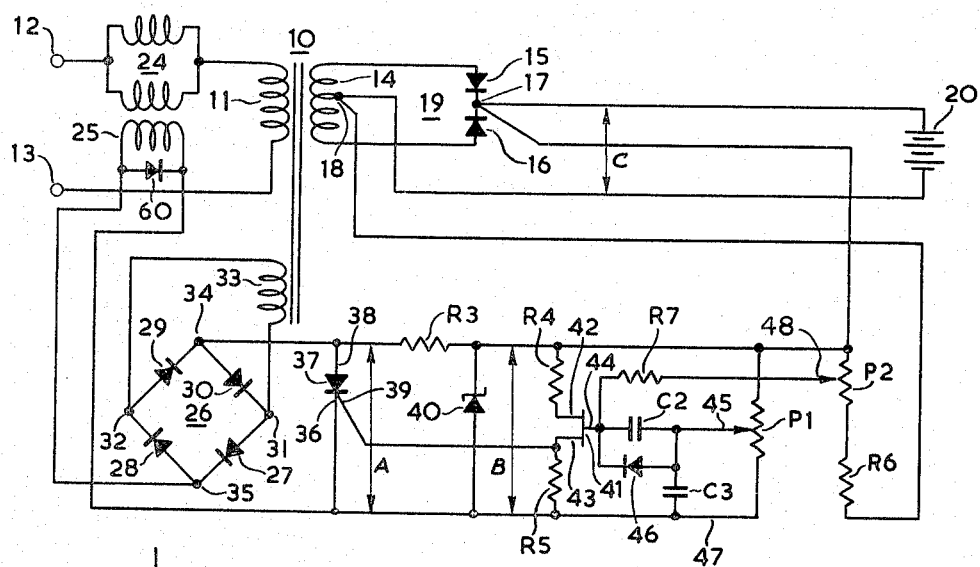
FIG. 2
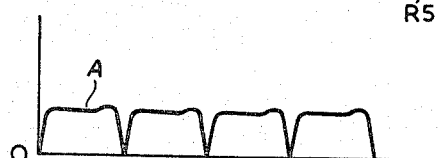
FIG. 3
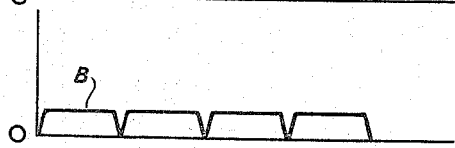
FIG. 4
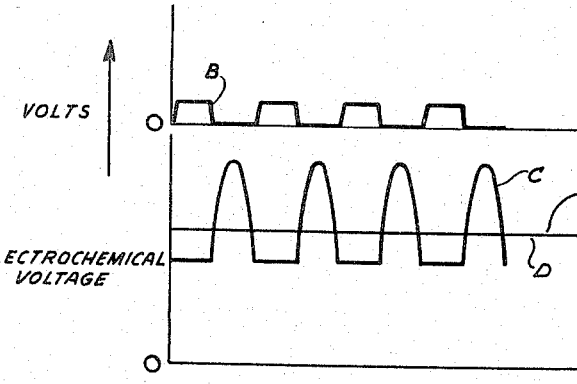
FIG. 5
FIG. 6
INVENTOR.
DAVID E. BAWDEN
BY
PATENT AGENT United States Patent Office 3,363,162
Patented Jan. 9, 1968

3,363,162
METHODS AND APPARATUS FOR CHARGING
BATTERY
David E. Bawden, 56 York Road, Willowdale,
Ontario, Canada
Filed Mar. 1, 1965, Ser. No. 435,946
2 Claims. (Cl. 320—27)

ABSTRACT OF THE DISCLOSURE

Charging of a battery is controlled by deriving a control signal corresponding to substantially the electrochemical voltage of the battery at a time when the charging current is zero and applying this control signal to a controller to control the supply of charging current to the battery responsive to the magnitude of the control signal.

This invention relates to the charging of batteries. More particularly, this invention relates to new and useful methods and apparatus for charging batteries wherein a control signal is employed that corresponds to the electrochemical or internal voltage of the battery under charge.

It is well known in the art of battery charging to employ battery chargers provided with sensing and control circuits which sense the output voltage of the rectifier of the charger during charging to give an indication of the progression of the charging operation, and, based on this information, make adjustments to vary the charging current. Thus, it is well known, for example, to connect a sensing device, such as the coil of a relay, for example, so as to permit it to be energized by the output voltage of the rectifier of the charger. The relay commonly is set to operate at the "gassing point" voltage of the battery, and when it operates, the normally closed contacts of the relay are opened to insert a resistor, with which the contacts are in parallel, in series with the battery to reduce charging current. Most relays which are so employed are of a type that respond to the time average of the voltage, although some respond to the R.M.S. value of the voltage.

The voltage across a relay in such a circuit consists of the following components:

(a) The actual counter EMF of the chemical reaction taking place in the battery, i.e., the electrochemical or internal voltage of the battery;

(b) The voltage drop due to the charging current flowing through the internal resistance of the battery, the resistance of the electrolyte, and the resistance of the connecting arms between the plates and terminals of the battery;

(c) Voltage drop due to charging current flowing through intercell connectors; and (d) Voltage drop due to charging current flowing through the resistance of charging cables and connections.

It has been appreciated that aforementioned items (c) and (d) do not contribute useful information pertaining to the state of charge of the battery. In fact, because of variations in charging current, length of leads and resistance of connections in different battery charging operations, the voltage seen by the relay can and does cause erroneous operation of the relay. In order to eliminate the aforementioned variables, it is well known to run separate leads from the coil of the relay to the terminals of the battery, since charging current does not flow through these leads.

While the aforementioned modification is an improvement over the basic system, it suffers from the disadvantage of requiring the use of additional leads and connectors which add to the cost of the equipment and the time required to set it up for battery charging. What is even more important, however, is that even this modified form of equipment does not take into consideration, remove, or even compensate for aberrations introduced by the factors noted in aforementioned item (b). These factors also do not contribute any useful information about the state of charge of the battery.

Accordingly, it is an important object of this invention to provide methods and apparatus for charging batteries wherein a control signal is employed that corresponds to the electrochemical voltage of the battery being charged, this control signal not being affected by or varying with any of the factors noted in the aforementioned items (b), (c) and (d).

How this object is achieved will become apparent from the following detailed disclosure. In brief, however, it will be noted that all of the factors noted in items (b), (c) and (d) are current dependent. In accordance with this invention their effect is eliminated, or at least markedly reduced, by obtaining a control voltage which necessarily is representative of the electrochemical voltage of the battery because it is obtained when the charging current is reduced to zero. This control signal may be used in any one of a number of conventional ways to control the supply of direct current to the battery, e.g., to continuously vary charging current dependent upon the magnitude of the control signal, to insert a limiting resistance in series with the battery when the control signal is of a predetermined magnitude, or to stop the charging operation altogether when the control signal is of a predetermined magnitude.

Two specific embodiments of this invention are set out in detail hereinafter, but it should be appreciated that these embodiments are illustrative only, and that many different approaches may be taken to achieve the aforementioned result. In other words, many different methods of control may be employed which will involve sensing of electrochemical voltage during a no charge current interval, and which will be gated so as not to respond to voltage during the time that charge current flows.

Two embodiments of this invention will now be described in conjunction with the appended drawings, in which:

FIGURES 1 and 2 are circuit diagrams illustrating two battery charging circuits which may be used to practise this invention and which embody this invention, and FIGURES 3-6 inclusive are graphs showing the voltage waveforms at various points in FIGURE 2.

Referring to FIGURE 1, the primary winding 11 of a power transformer 10 has terminals 12 and 13 which are connected to any suitable single phase A.C. source (not shown). The secondary winding 14 of transformer 10 has its two ends connected through two diodes 15 and 16 to an output terminal 17. The other terminal 18 of the rectifier provided by so connecting winding 14 and diodes 15 and 16 is a centre tap on winding 14. The circuit indicated generally by 19 and consisting of winding 14, diodes 15 and 16 and terminals 17 and 18 is a conventional full wave centre tap rectifier, and this circuit together with primary winding 11 constitutes a conventional A.C. to D.C. converter. Other types of converters or sources of pulsating direct current that have from time to time a magnitude of zero amperes may be employed without departing from this invention, of course.

The battery to be charged is indicated at 20. One terminal of battery 20 is connected through a resistor R1 to output terminal 17, while the other terminal of battery 20 is connected to output terminal 18. Connected across the terminals of battery 20 is a series circuit consisting of a resistor R2 and the coil 21 of a relay. A diode 22 is connected in the direction shown in the figure in parallel with resistor R2, while a capacitor C1 shunts coil 21. The normally closed contacts 23 of the relay are connected in parallel with resistor R1 and thereby normally short circuit this resistor.

The time constant of capacitor C1 and the resistance of coil 21 is very long compared to the time required for one cycle of the A.C. source (not shown) connected to terminals 12 and 13. The forward resistance of diode 22 is very small compared to the resistance of resistor R2, so that the charging time constant of capacitor C1, which is charged through resistor R2, is long compared with the discharge time constant of the capacitor, which is discharged through diode 22.

The operation of the battery charging circuit shown in FIGURE 1 constitutes one method of practising this invention and now will be described.

A single phase, A.C., sinusoidal voltage is applied to terminals 12 and 13, and a full wave, rectified, D.C. output voltage appears across terminals 17 and 18, the former being positive and the latter negative. This D.C. voltage is applied to battery 20 through normally closed contacts 23 and charges the battery. Because of the back EMF of the battery, no charge current will be supplied to the battery when the A.C. voltage of transformer 11 is instantaneously less than the battery EMF.

During intervals when charge current is flowing, capacitor C1 charges through resistor R2. During no charge current intervals, however, capacitor C1 discharges through diode 22 until the voltage across capacitor C1, and hence across relay coil 21, is equal to the electrochemical voltage of battery 20. Thus, during no charge current intervals, the electrochemical voltage of battery 20 is sensed and applied across a control device, namely relay coil 21. Coil 21 is selected so that when the electrochemical voltage of the battery reaches a predetermined value, e.g., the gassing point EMF, contacts 23 are opened to insert the charge current limiting resistor R1 in series with battery 20. The relay may be temperature compensated to allow for observed characteristics of battery 20.

It should be noted that during intervals when charge current is flowing capacitor C1 will charge due to the increase in voltage attributable to aforementioned items (b), (c) and (d). This effect can be made negligible, however, provided that resistor R2 is made sufficiently large, and hence the voltage across capacitor C1 is substantially the electrochemical voltage of the battery.

It can be seen from the foregoing that a control signal is derived which corresponds to substantially the electrochemical voltage of the battery. The control signal is supplied to a control device to render the control device operative to control the supply of direct current to the battery in accordance with the magnitude of the control signal. In other words, sensing of the control signal and any necessary consequent functioning of the control device takes place as a result of the voltage derived during zero charge current intervals.

Another battery charging circuit embodying this invention is shown in FIGURE 2, to which reference now is made. In the battery charger of FIGURE 2 there is a transformer 10 having a primary winding 11 and a secondary winding 14. The ends of primary winding 11 are connected to terminals 12 and 13 to which any suitable A.C. source may be connected. In series with primary winding 11 is a saturable reactor 24 having a D.C. control winding 25 shunted by a diode 60. The ends of secondary winding 14 are connected through diode 15 and 16 to an output terminal 17. The other terminal 18 of the rectifier 19 formed by winding 14 and diodes 15 and 16 so connected is a centre tap on secondary winding 14. A battery 20 to be charged is connected across terminals 17 and 18. The circuitry just described is, of course, the same as the corresponding circuitry in FIGURE 1 with the exception of the provision of saturable reactor 24.

The control circuit employed in this battery charger now will be described. D.C. power for the control circuitry is supplied from a conventional full wave bridge rectifier 26 employing diodes 27, 28, 29 and 30 connected as shown in FIGURE 2, alternating current being supplied to rectifier 26 at input terminals 31 and 32 from a separate secondary winding 33 of transformer 10. Terminals 34 and 35 are the D.C. output terminals for rectifier 26, terminal 34 being positive, and terminal 35 being negative. One end of D.C. control winding 25 is connected to terminal 35, while the other end of winding 25 is connected to the cathode 36 of a silicon controlled rectifier 37 which also has an anode 38 and a gate electrode 39. Connected to the anode and cathode of silicon controlled rectifier 37 is a series circuit consisting of a current limiting resistor R3 and a Zener diode 40. A unijunction transistor 41 having base electrodes 42 and 43 and an emitter electrode 44 is provided. Unijunction transistor 41 and current limiting resistors R4 and R5 are connected in series circuit across Zener diode 40. A potentiometer P1 having a slide 45 also is connected across the terminals of Zener diode 40. Slide 45 is connected to emitter electrode 44 through a capacitor C2 which is in parallel with a diode 46. Slide 45 also is connected to a common conductor 47 through a capacitor C3. The common terminal of base electrode 43 and resistor R5 is connected to gate electrode 39.

A control signal is obtained from terminals 17 and 18 and is developed across a potentiometer P2 and a resistor R6. The slide 48 of potentiometer P2 is connected through a resistor R7 to emitter electrode 44. The positive terminal of potentiometer P2 is connected to positive terminal 34 of rectifier 26.

The waveform designated A and shown in FIGURE 3 is approximately the voltage waveform which appears across silicon controlled rectifier 37 in FIGURE 2 when this rectifier has not fired. The waveform B shown in FIGURE 4 is the voltage appearing across Zener diode 40 when the voltage across silicon controlled rectifier 37 varies as shown by waveform A in FIGURE 3.

The voltage waveform B shown in FIGURE 5 is the voltage across Zener diode 40 when silicon controlled rectifier 37 fires for a part of each half cycle of alternating current.

The voltage waveform C shown in FIGURE 6 is the voltage applied to battery 20 during charging thereof when the voltage across Zener diode 40 is as shown by waveform B in FIGURE 5. The line D in FIGURE 6 is the average voltage, which is the voltage commonly sensed using conventional charging equipment, whereas the instant invention senses electrochemical voltage as indicated in FIGURE 6.

It will be appreciated, of course, that with proper selection of the secondary voltage of transformer 10, a full wave bridge rectifier may be employed in place of rectifier 19. Also power for the control circuit need not necessarily be supplied by a separate secondary winding 33 of transformer 10, although this is a preferable arrangement. Power could be supplied from directly across the primary winding 11 of transformer 10 or from a separate auxiliary transformer connected to the A.C. source.

The operation of the circuit shown in FIGURE 2 now will be discussed. Silicon controlled rectifier 37 normally blocks the flow of current through it in both directions. However, if at any time a pulse of voltage is applied to gate electrode 39 making this electrode positive with respect to cathode 36, the silicon controlled rectifier will break down and conduct current in the forward direction, i.e., from anode 38 to cathode 36. When this happens, it will be appreciated that direct current will flow from positive terminal 34 through silicon controlled rectifier 37 and D.C. control winding 25 returning to negative terminal 35 of rectifier 26. When silicon controlled rectifier 37 is in its nonconducting state, the main D.C. voltage from rectifier 26 appears across silicon controlled rectifier 37, the waveform being as shown in A in FIGURE 3, each half wave of alternating current from secondary winding 33 appearing as a half wave positive pulse delivered to the control circuit. This series of half wave positive pulses also appears across resistor R3 and Zener diode 40 in series. The Zener diode will pass current in a forward direction in the same manner as a diode, but in the reverse direction allows the voltage to rise to a certain fixed level and then breaks down. Resistor R3 limits the current passing through Zener diode 40 after breakdown. Thus, when a voltage having waveform A is applied across resistor R3 and Zener diode 40, the waveform appearing across Zener diode 40 will be as shown at B in FIGURE 4. In other words, the half wave positive pulses shown at A in FIGURE 3 build up until the Zener breakdown voltage is reached. The voltage then is maintained at this level until the half wave positive pulses from rectifier 26 drop below the Zener breakdown voltage, at which time the voltage across Zener diode 40 follows the half wave positive pulses to zero. Since the breakdown voltage of Zener diode 40 is a small percentage of the maximum voltage appearing across silicon controlled rectifier 37, the portion of the control circuit connected across Zener diode 40 sees essentially a series of square waves with a spike to zero at the end of each half cycle. However, should a positive pulse be supplied to gate electrode 39 of silicon controlled rectifier 37 before the end of any half cycle, the silicon controlled rectifier will break down, as aforementioned, thus shorting resistor R3 and Zener diode 40, and causing the voltage across Zener diode 40 to drop to zero for the remainder of that half cycle. This is illustrated by the waveform B shown in FIGURE 5, which is drawn for a condition when the silicon controlled rectifier fires just before the middle of a half cycle.

Unijunction transistor 41 has characteristics such that the resistance between base 42 and base 43 and from emitter 44 to base 43 is quite high with the emitter open circuit and no current is passed through the unijunction transistor. However, with voltage applied to base 42, when the emitter voltage is gradually increased, at some definite percentage of the voltage applied to base 42, the junction between emitter 44 and base 43 will break down, and the emitter voltage will appear at base 43 being developed across resistor R5. By supplying emitter 44 from a capacitor, the effect of breaking down the emitter 44-base 43 voltage is to permit the capacitor to discharge through this junction, so that a voltage pulse is developed across resistor R5. This pulse is applied to gate electrode 39 of silicon controlled rectifier 37 causing it to turn on. It will be appreciated that while the percentage of the base 42 voltage at which the emitter 44-base 43 junction will break down will vary from transistor to transistor, the percentage for any given transistor is a definite value.

By raising slide 45 of potentiometer P1 to the top or positive end of the potentiometer, capacitor C3 will charge very rapidly. If, on the other hand, slide 45 is placed at the bottom or negative end of potentiometer P1, capacitor C3 will not charge at all. Thus, by setting slide 45 on potentiometer P1 at any given point, the time taken to charge capacitor C3 to some value can be varied over a considerable range. Note that since the potentiometer is connected across Zener diode 40, the voltage across this potentiometer will fall to zero at the end of each half cycle. If slide 45 is set at a point that capacitor C3 will charge to a voltage higher than that required to break down the emitter 44-base 43 junction of unijunction transistor 41, when this point is reached, capacitor C3 will discharge through the diode 46, the emitter 44-base 43 junction and resistor R5. This will provide the necessary pulse to break down silicon controlled rectifier 37, shorting the supply to the entire control circuit for the remainder of the half cycle. It should be noted that at the end of the half cycle, when the current through silicon controlled rectifier 37 drops to zero, the silicon controlled rectifier recovers its blocking characteristics, and the voltage again will build up across the control circuit on the next half cycle. In this regard, diode 60 allows the induced voltage in winding 25 to circulate current to permit the anode current of silicon controlled rectifier 37 to drop below the holding current each one-half cycle, and hence reset for the following one-half cycle. With potentiometer P1 set below the point where the emitter 44-base 43 junction of unijunction transistor 41 will break down, capacitor C3 will have a residual charge remaining at the end of the half cycle. At this time, the base 42 voltage of unijunction transistor 41 drops to zero, and since the capacitor holds the emitter voltage up, the percentage of emitter 44-base 43 voltage necessary to break down this junction is exceeded. Thus, a pulse will be supplied to the gate electrode of silicon controlled rectifier 37 at the end of each half cycle. However, since the voltage is, by this time, very nearly zero, the D.C. current supplied to winding 25 of saturable reactor 24 is very small.

Since the series combination of potentiometer P2 and resistor R6 is connected across the D.C. output terminals of main rectifier 19 and the positive output terminal 17 of this rectifier is connected to the positive terminal 34 of rectifier 26, the setting of potentiometer P2 slide 48 represents some portion of the charger D.C. output voltage. This portion will be called the feedback voltage and will correspond to that portion of the voltage appearing between the cathode of Zener diode 40 and the slide 48 on potentiometer P2. The voltage appearing on slide 48 of potentiometer P2 is applied through series resistor R7 to emitter 44 of unijunction transistor 41. This voltage will tend to hold the emitter of the unijunction transistor negative with respect to base 42, and hence help prevent it from reaching the percentage of base 42 voltage necessary to break down the emitter 44-base 43 junction.

If slide 48 on potentiometer P2 is set to its most negative value, i.e., to the bottom of potentiometer P2, and slide 45 on potentiometer P1 is raised to the point where emitter 44-base 43 junction does not quite break down in any given half cycle, and if potentiometer P2 then is reset to derive a slightly less negative voltage, the sum of the voltages across capacitor C3 and C2 will reach a value sufficient to break down emitter 44-base 43 junction. This will fire silicon controlled rectifier 37 causing D.C. current to be supplied to winding 25 from rectifier 26. The consequent D.C. saturation of saturable reactor 24 will increase the voltage across primary winding 11 and consequently the secondary voltage of transformer 10 and the voltage applied to battery 20 from terminals 17 and 18 of rectifier 19. This in turn will increase the voltage across potentiometer P2 and resistor R6 increasing the feedback voltage and driving the voltage on slide 48 negative with respect to the terminal of potentiometer P2 connected through resistor R3 to positive terminal 34 of rectifier 26. The emitter voltage of unijunction transistor 41 thus will be lowered preventing further emitter 44-base 43 junction breakdown. On the other hand, should the voltage across terminals 17 and 18 drop, the voltage at slide 48 will be driven more positive causing emitter 44 voltage to rise and emitter 44-base 43 junction to break down firing silicon controlled rectifier 37. D.C. current then will be supplied to control winding 25 raising the voltage across terminals 17 and 18 in the aforementioned manner. Thus, it may be seen that the control circuit will regulate battery voltage to any value which is determined by the setting of slide 48 on potentiometer P2.

Assume that it is desired to charge a battery 20. Potentiometer P2 is set to the desired value of final charge voltage on the battery. When battery 20 is first connected to terminals 17 and 18, the battery voltage will be very low. Consequently, the control circuit will fire silicon controlled rectifier 37 on every half cycle so that waveforms of the type shown by B and C in FIGURES 5 and 6 will result. Since the voltage between slide 48 and the upper terminal of potentiometer P2 will be small, capacitors C2 and C3 will charge rapidly during the initial charging of the battery causing firing of unijunction transistor 41 early in a half cycle. This will supply a large D.C. current from rectifier 26 to control winding 25 saturating reactor 24 heavily. This in turn will cause the D.C. output of rectifier 19 to be large. As shown by FIGURE 6, rectifier 19 causes a large pulse of current to be delivered to battery 20 during the period when silicon controlled rectifier 37 has shorted the D.C. power supply to the control circuit and the regulator portion of this circuit consequently is not in operation, or, in other words, has been gated out. During the period when no charging current is delivered to battery 20, the voltage which is seen across potentiometer P2 and resistor R6 is substantially the electrochemical voltage of the battery. Thus, during each period at the beginning of a half cycle when Zener voltage exists, the control circuit is in operation and senses substantially the electrochemical voltage of battery 20 which gives an indication of the existing state of charge of battery 20. Having determined this voltage, the control circuit decides whether or not this voltage is at the desired level. If it is not, the control circuit fires silicon controlled rectifier 37. However, if the voltage is at the desired level, silicon controlled rectifier 37 will not be fired. Thus on every half cycle the control circuit determines whether or not the electrochemical voltage of the battery is correct at a time when no charge current is flowing in the battery and takes appropriate action.

While this invention has been illustrated in connection with single phase circuits, it will be appreciated that the invention may be applied in three phase circuitry.

While preferred embodiments of this invention have been set out in detail herein, those skilled in the art will appreciate that changes and modifications may be made therein without departing from the spirit and scope of this invention as defined in the appended claims.

What I claim as my invention is:

1. Battery charging apparatus comprising; a source of pulsating direct current producing a D.C. voltage that has from time to time a magnitude less than the back E.M.F. of the battery to be charged; means for supplying said direct current as charging current to a battery to be charged, said charging current having from time to time a magnitude of zero amperes; control means for controlling the supply of said charging current to said battery; and means for (a) deriving a control signal corresponding to substantially the electrochemical voltage of said battery, said control signal being derived only during intervals when said charging current is zero, (b) supplying said control signal to said control means to render said control means operative to control the supply of said charging current to said battery in accordance with the magnitude of said control signal only when said charging current is zero, and (c) rendering said control means inoperative to vary the supply of said charging current to said battery when said charging current is being supplied to said battery to charge said battery.

2. Battery charging apparatus comprising; a source of pulsating direct current producing a D.C. voltage that has from time to time a magnitude less than the back E.M.F. of the battery to be charged; means for supplying said direct current as charging current to a battery to be charged, said charging current having from time to time a magnitude of zero amperes; and control means for controlling the supply of said charging current to said battery, said control means comprising a saturable reactor having a control winding, A.C. to D.C. converting means having a positive and a negative output terminal, a silicon controlled rectifier having anode, cathode and gate electrodes, a Zener diode having an anode and a cathode, a unijunction transistor having emitter and first and second base electrodes, first and second potentiometers each having a movable contact, first, second and third current limiting resistors, first and second capacitors, and a diode, said Zener diode and said first current limiting resistor being connected in series circuit, said series circuit being connected in parallel with said silicon controlled rectifier, said second and third current limiting resistors each being connected to a different one of said base electrodes, said second and third resistors and said first and second base electrodes being connected in parallel with said Zener diode, said first potentiometer being connected in parallel with said Zener diode, said movable contact of said first potentiometer being connected to said emitter electrode through one of said capacitors, said diode being connected in parallel with said one capacitor and providing a discharge path for the other of said capacitors, said movable contact of said first potentiometer also being connected through the other of said capacitors to said cathode of said silicon controlled rectifier, said second potentiometer being connected across said battery and also to said positive output terminal, said movable contact of said second potentiometer being connected to said emitter electrode, said anode of said silicon controlled rectifier and said cathode of said Zener diode being connected to said positive output terminal, said control winding being connected to said negative output terminal and said cathode of said silicon controlled rectifier, said gate electrode being connected to one of said base electrodes to receive positive pulses from said unijunction transistor.

References Cited

UNITED STATES PATENTS

| 3,252,070 | 5/1966 | Medlar et al. | 320—21 |
| 3,160,805 | 12/1964 | Lawson | 320—39 |
| 3,195,029 | 7/1965 | Gilbreath | 323—22 X |
| 3,281,638 | 10/1966 | Crawford | 320—40 |

JOHN F. COUCH, *Primary Examiner.*

S. WEINBERG, *Assistant Examiner.*